(12) United States Patent
Jung et al.

(10) Patent No.: US 12,505,055 B2
(45) Date of Patent: Dec. 23, 2025

(54) MEMORY CONTROLLER AND DATA INPUT/OUTPUT METHOD THEREOF

(71) Applicant: SK hynix Inc., Gyeonggi-do (KR)

(72) Inventors: In Ho Jung, Gyeonggi-do (KR); Jun Rye Rho, Gyeonggi-do (KR); Jae Yong Park, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/754,182

(22) Filed: Jun. 26, 2024

(65) Prior Publication Data

US 2025/0077449 A1 Mar. 6, 2025

(30) Foreign Application Priority Data

Sep. 6, 2023 (KR) .................. 10-2023-0118233

(51) Int. Cl.
*G06F 13/18* (2006.01)
*G06F 13/16* (2006.01)

(52) U.S. Cl.
CPC .......... *G06F 13/18* (2013.01); *G06F 13/1642* (2013.01); *G06F 13/1663* (2013.01)

(58) Field of Classification Search
CPC .. G06F 13/18; G06F 13/1642; G06F 13/1663; G06F 13/1668; G06F 13/24; G06F 13/14; G06F 3/0656; G06F 3/0658; G06F 3/0659

See application file for complete search history.

(56) References Cited

U.S. PATENT DOCUMENTS

| | | | |
|---|---|---|---|
| 7,596,650 B1 * | 9/2009 | Aditya | G06F 13/4004 710/301 |
| 10,838,868 B2 | 11/2020 | Chen et al. | |
| 2011/0252177 A1 | 10/2011 | Cho | |
| 2015/0074343 A1 * | 3/2015 | Eleftheriou | G06F 3/0661 711/103 |
| 2022/0147470 A1 * | 5/2022 | Lee | G06F 13/4022 |
| 2022/0214984 A1 * | 7/2022 | Lee | G06F 13/24 |
| 2022/0350533 A1 * | 11/2022 | Cresci | G06F 3/0613 |
| 2023/0162766 A1 * | 5/2023 | Jo | G11C 7/109 365/189.05 |

FOREIGN PATENT DOCUMENTS

KR 10-2016-0036794 A 4/2016

\* cited by examiner

*Primary Examiner* — Tracy A Warren
(74) *Attorney, Agent, or Firm* — IP & T GROUP LLP (57) ABSTRACT

Provided herein may be a memory controller. The memory controller may include a shared memory configured to store data, a hardware group configured to generate entry data including result data of an operation corresponding to a command, and output an interrupt signal generated in response to storage of the entry data, and a processor group configured to receive the entry data from the shared memory, wherein the processor group includes an interface converter configured to manage first index information of the entry data in response to the interrupt signal, and generate a first address for the entry data based on the first index information, and a data transmitter configured to receive, based on a first address, the entry data through a first interface using a data input/output scheme to be set by firmware, and transfer the received entry data to a processor through a second interface using a fixed data input/output scheme.

20 Claims, 4 Drawing Sheets

MEMORY CONTROLLER AND DATA INPUT/OUTPUT METHOD THEREOF

CROSS-REFERENCE TO RELATED APPLICATION

The present application claims priority under 35 U.S.C. § 119(a) to Korean patent application number 10-2023-0118233 filed on Sep. 6, 2023, the entire disclosure of which is incorporated by reference herein.

BACKGROUND

1. Field of Invention

Various embodiments of the present disclosure relate to a memory controller, and more particularly to a memory controller and a data input/output method thereof.

2. Description of Related Art

A memory system is a device which stores data according to a request from a host device, such as a computer or a smartphone. A storage device may include a memory device in which data is stored and a memory controller which controls the memory device. The memory device may be a volatile memory device or a nonvolatile memory device.

The volatile memory device is a memory device in which data is stored only when power is supplied and in which stored data is lost when the supply of power is interrupted. The volatile memory device may be a static random access memory (SRAM), a dynamic random access memory (DRAM), or the like.

The nonvolatile memory device is a memory device in which stored data is retained even when the supply of power is interrupted. The nonvolatile memory device may be a read only memory (ROM), a programmable ROM (PROM), an electrically programmable ROM (EPROM), an electrically erasable and programmable ROM (EEPROM), a flash memory, or the like.

Data stored in the memory device may be transferred to and processed by a core unit. The core unit may input and output data through an interface. Data input/output performance may vary depending on the interface. In order to satisfy required data input/output performance, the use of a suitable interface may be required.

SUMMARY

Various embodiments of the present disclosure are directed to a memory controller having improved data input/output performance, and a method of transferring data to a processor through a plurality of interfaces.

An embodiment of the present disclosure may provide for a memory controller. The memory controller may include a shared memory configured to temporarily store data, a hardware group configured to generate entry data including result data of an operation corresponding to a received command, and output an interrupt signal generated in response to storage of the entry data in the shared memory, and a processor group configured to receive the entry data from the shared memory, wherein the processor group includes an interface converter configured to manage first index information of the entry data stored in the shared memory in response to the interrupt signal, and generate a first address for the entry data based on the first index information, and a data transmitter configured to receive, based on a first address, the entry data through a first interface using a data input/output scheme that is to be set by firmware, and transfer the received entry data to a processor through a second interface using a fixed data input/output scheme.

An embodiment of the present disclosure may provide for a method of operating a memory controller. The method may include storing, in a shared memory, entry data including result data of an operation corresponding to a command, generating an interrupt signal in response to storage of the entry data, generating a first address indicating a location at which the entry data is stored in the shared memory, based on first index information stored in a processor group in response to the interrupt signal, receiving, based on the first address, the entry data through a first interface using a data input/output scheme that is to be set by firmware, and transferring the received entry data to a processor through a second interface using a fixed data input/output scheme.

An embodiment of the present disclosure may provide for a memory controller. The memory controller may include a shared memory configured to temporarily store data, a data generation group configured to generate entry data to be transferred to a processor, and store the entry data in the shared memory, and a data processing group configured to receive the entry data stored in the shared memory through a first interface using a data input/output scheme which is to be set by firmware, and transfer the entry data to the processor through a second interface using a fixed data input/output scheme.

DETAILED DESCRIPTION

Specific structural or functional descriptions of the embodiments of the present disclosure introduced in this specification are provided as examples to describe embodiments according to the concept of the present disclosure. The embodiments according to the concept of the present disclosure may be practiced in various forms, and should not be construed as being limited to the embodiments described in the specification.

Figure 1:
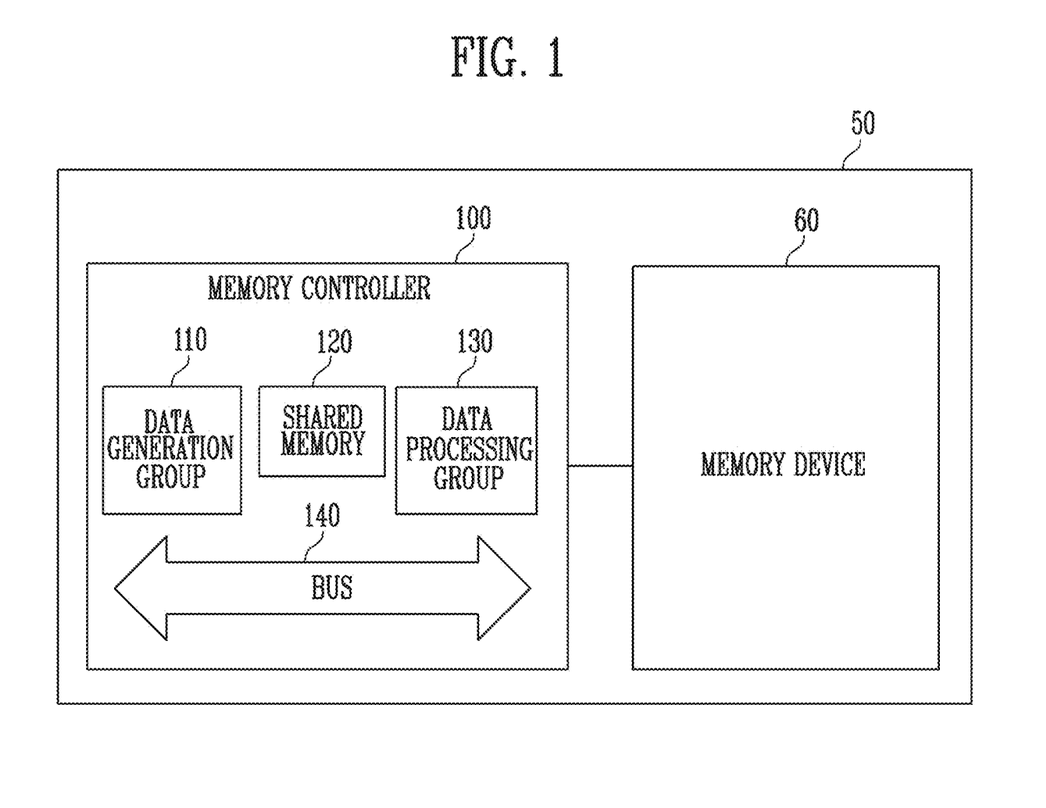
FIG. 1 is a diagram illustrating a storage device including a memory controller according to an embodiment of the present disclosure.

FIG. 1 is a diagram illustrating a storage device 50 including a memory controller 100 according to an embodiment of the present disclosure.

Referring to FIG. 1, the storage device 50 may include a memory device 60 and the memory controller 100 which controls operations of the memory device 60. The storage device 50 may be a device which stores data according to a request from a host device, such as a solid state drive (SSD), a mobile phone, a smartphone, an MP3 player, a laptop computer, a desktop computer, a game console, a television (TV), a tablet PC, or an in-vehicle infotainment system.

The memory device 60 may store data. The memory device 60 may be operated in response to the control of the memory controller 100. The memory device 60 may include a memory cell array including a plurality of memory cells which store data.

The memory device 60 may receive a command and an address from the memory controller 100, and may access an area of the memory cell array, selected by the address. The memory device 60 may perform an operation indicated by the command on the area selected by the address.

The memory controller 100 may control operations of the storage device 50. The memory controller 100 may control the memory device 60 to perform a program operation, a read operation or an erase operation according to a request received from the host device.

In an embodiment of the present disclosure, the memory controller 100 may include a data generation group 110, a shared memory 120, and a data processing group 130. The data generation group 110, the shared memory 120, and the data processing group 130 may transmit data through a bus 140. In an embodiment of the present disclosure, the shared memory 120 may be a static random access memory (SRAM). A time required for data input/output in the shared memory 120 may be shorter than the time required by a processor to process data. The time required for data input/output in the SRAM may be shorter than the time required by the processor to process data. In an embodiment of the present disclosure, the bus 140 may be a path through which data is transferred, and may be a multi-channel bus. In the multi-channel bus, respective channels may be independently operated, and thus respective data transfer rates may be maintained even when data transfer rates are different from each other depending on devices.

The data generation group 110 may be a module which generates data to be transferred to the processor. The module may include logic circuits which process commands received from an external system. Power, clock signals, etc., which are applied to the module, may be shared by components included in the module.

In an embodiment of the present disclosure, the data generation group 110 may be a hardware group which generates data including the result of performing an operation in response to the received command, or a processor group which includes another processor. The data generated by the data generation group 110 may be entry data. For example, the data generation group 110 may generate the entry data from data indicating read data or read fail in response to the reception of a read command.

The shared memory 120 may temporarily store the data received through the bus. The shared memory 120 may store the entry data generated by the data generation group 110, and may transfer the stored entry data to the data processing group 130.

The data processing group 130 may receive the entry data from the shared memory 120 through a first interface. The first interface may be an interface, a data input/output scheme of which can be set by firmware. During the boot operation of the storage device 50, the firmware may set the first interface to the data input/output scheme changed by a user.

The data processing group 130 may transfer the received entry data to the processor through a second interface. The second interface may be an interface using a fixed data input/output scheme and cannot be changed. In an embodiment of the present disclosure, the processor may be included in the data processing group 130, or may be located outside the data processing group 130. The data processing group including the processor may be designated as a processor group.

In an embodiment of the present disclosure, the second interface may have a data input/output speed higher than that of the first interface. Since the data input/output scheme of the first interface can be changed, the first interface may enable flexible data processing. The data processing group 130 may transfer the entry data received through the first interface to the processor through the second interface, thus improving the data input/output speed while flexibly processing data.

Figure 2:
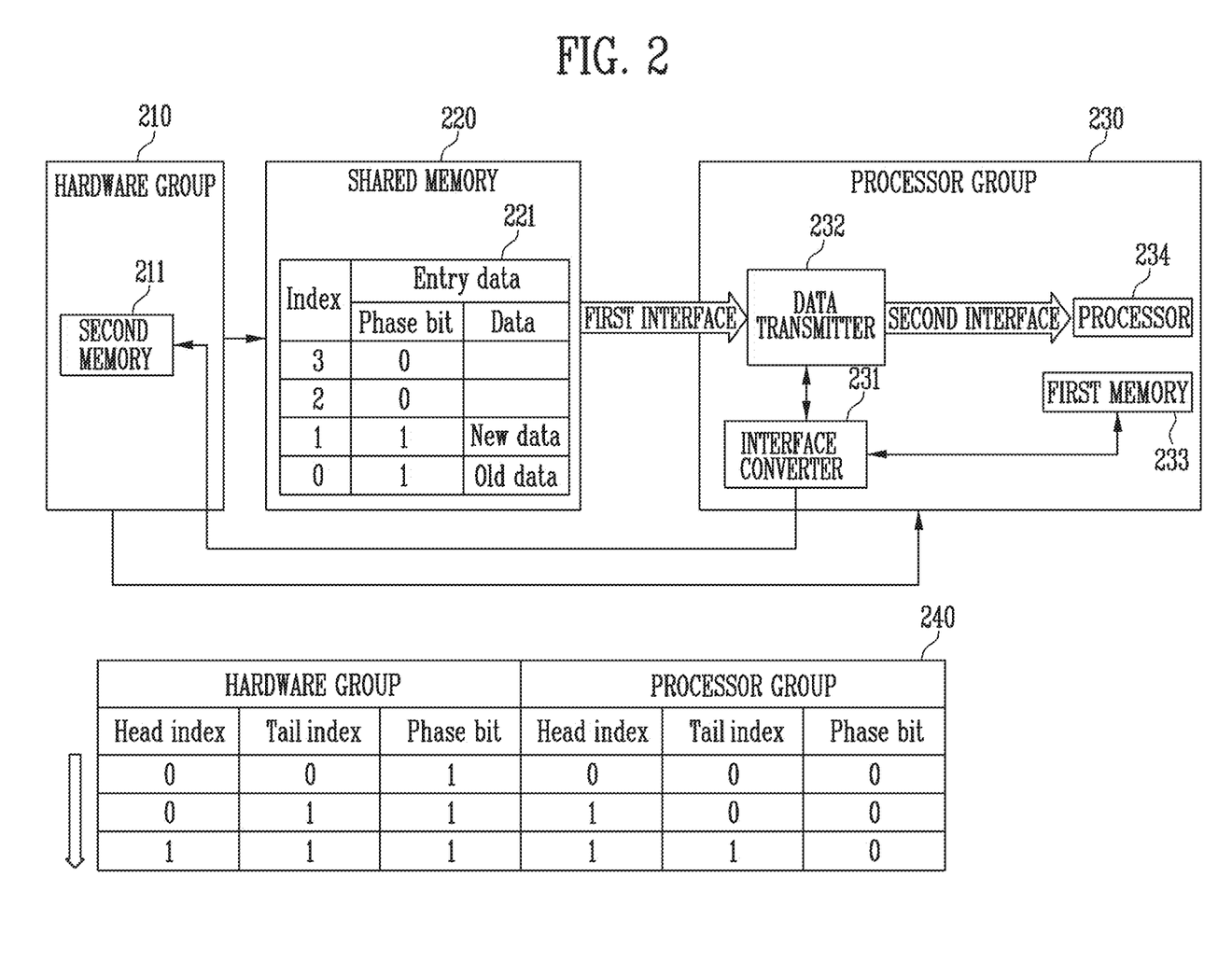
FIG. 2 is a diagram illustrating a memory controller for transferring entry data stored in a shared memory to a processor according to an embodiment of the present disclosure.

FIG. 2 is a diagram illustrating a memory controller for transferring entry data stored in a shared memory to a processor according to an embodiment of the present disclosure.

Referring to FIG. 2, a process in which entry data stored in a shared memory 220 is transferred to a processor 234 may be illustrated. In FIG. 2, a data generation group is a hardware group 210 which generates data by receiving a command, and a data processing group is a processor group 230 including the processor 234. In FIG. 2, entry data is stored at index #1 in the entry table 221 of the shared memory 220. The maximum index value in the entry table 221 may be 3.

The hardware group 210 may generate entry data including the result data of an operation corresponding to the received command. The hardware group 210 may store the generated entry data in the shared memory 220. In an embodiment of the present disclosure, a process of storing the generated entry data in the shared memory 220 may be regarded as data update.

The hardware group 210 may include a second memory 211 which stores index information and a phase bit indicating the state of the entry data therein. The index information stored in the second memory 211 may be second index information. The second index information may include a head index value and a tail index value. The phase bit stored in the second memory 211 may be a second phase bit.

The hardware group 210 may manage the second index information of the entry data in response to the generation of the entry data. The hardware group 210 may increase the tail index value of the second index information by 1 in response to the generation of the entry data. The hardware group 210 may generate a second address indicating a location at which the entry data is to be stored in the shared memory 220 based on the tail index value of the second index information.

The hardware group 210 may initialize the tail index value and change the second phase bit in response to the case where the tail index value of the second index information exceeds a preset maximum value. The maximum value may be preset according to the size of a queue set by firmware. For example, the case where entry data is generated when the preset maximum value is 3 and the tail index value of the second index information is 3 is shown. Because the tail index value of the second index information is increased by 1 and exceeds the maximum value of 3, the hardware group 210 may initialize the tail index value of the second index information to 0 and change the value of the second phase bit. In an embodiment of the present disclosure, the second phase bit may be located at the most significant bit (MSB) of the entry data. The hardware group 210 may store the entry data in the shared memory 220 according to the generated second address. The hardware group 210 may generate an interrupt signal in response to the storage of the entry data in the shared memory 220. The hardware group 210 may transfer the generated interrupt signal to the processor group 230. Here, the transferred interrupt signal may include information indicating that the entry data has been stored in the shared memory 220.

The processor group 230 may include an interface converter 231, a data transmitter 232, a first memory 233, and the processor 234. The processor group 230 may receive the entry data from the shared memory 220.

The interface converter 231 may manage first index information of the entry data stored in the shared memory 220 in response to the interrupt signal. The first memory 233 may store the first index information and a first phase bit indicating the state of the first interface.

The interface converter 231 may increase the tail index value of the first index information by 1. The interface converter 231 may generate a first address for the entry data based on a value increased from the head index value of the first index information by 1. The first address may be transferred to the data transmitter 232.

In an embodiment of the present disclosure, the interface converter 231 may increase each of the tail index value and the head index value of the first index information by 1 in response to the reception of the interrupt signal, or may increase the head index value of the first index information by 1 after the entry data is transferred to the processor 234.

The interface converter 231 may update the first phase bit in response to the case where the head index value of the first index information reaches a maximum value. The maximum value may be determined according to the size of the queue set by the firmware. For example, the maximum value may be 3. When the head index value of the first index information is 0, the first phase bit may be maintained. When the head index value of the first index information is 3, the first phase bit may be changed.

The first address may be an address indicating a location at which the entry data is stored in the shared memory 220. The first address and the second address may match each other to indicate the same location in the shared memory 220.

The data transmitter 232 may receive the entry data through the first interface using a data input/output scheme that can be set by the firmware, based on the first address. In an embodiment of the present disclosure, the first interface may be a software queue that is a flexible interface. The software queue may be an interface that allows the user to set the size of the queue in which the entry data is stored.

The data transmitter 232 may store the received entry data in a buffer memory. The buffer memory may be an SRAM included in the data transmitter 232. The data transmitter 232 may determine whether entry data is received, based on the first phase bit and the second phase bit included in the entry data. The second phase bit may be set by the hardware group 210.

In an embodiment of the present disclosure, the data transmitter 232 may store the entry data in the buffer memory in response to the case where the values of the first phase bit and the second phase bit are different from each other. Initial values of the first phase bit and the second phase bit may be set to different values. The first phase bit and the second phase bit may be used to verify the reliability of the entry data.

The value of the first phase bit and the value of the second phase bit may indicate whether data has been updated. For example, when the preset maximum value is 3 and the tail index value of the second index information is 3, the hardware group 210 may change the value of the second phase bit in response to the generation of the entry data. Before the update of the entry data is completed in the state in which the value of the second phase bit is changed, the value of the first phase bit may be maintained, and thus the case where the value of the first phase bit and the value of the second phase bit are equal to each other may mean that the update of data is not completed. Similarly, the case where the value of the first phase bit and the value of the second phase bit are different from each other may mean that the update of data has been completed.

The case where, after an interrupt is incurred by the hardware group 210, the value of the first phase bit and the value of the second phase bit are equal to each other for a certain period of time or longer may mean that a data transmission error occurs. The data transmission error may mean that, after the generation of the entry data, the entry data is not stored in the shared memory 220 until a certain period of time has elapsed.

The data transmitter 232 may transfer the received entry data to the processor through the second interface using a fixed data input/output scheme. In an embodiment of the present disclosure, the second interface may be a first-in, first-out (FIFO) (or first-input, first-output) interface that is a static interface. The FIFO interface may be an interface connected in a peer-to-peer manner in which a transmitting end and a receiving end are directly connected to each other. The data transmitter 232 may be directly connected to the processor 234 to transmit/receive data. Because the second interface does not manage the address of data, the second interface may perform a data input/output operation at speed higher than that of the first interface.

The data transmitter 232 may output a result signal indicating the result of transferring the entry data through the second interface to the interface converter 231. The interface converter 231 may update the tail index value of the first index information and the head index value of the second index information, based on the received result signal. The interface converter 231 may increase each of the tail index value of the first index information and the head index value of the second index information by 1 in response to the transfer of the entry data to the processor 234. In an embodiment of the present disclosure, the interface converter 231 may increase the head index values of the first index information and the second index information by 1 in accordance with the case where only the tail index value of the first index information is increased in response to the reception of the interrupt signal.

In FIG. 2, the head index value and the tail index value of the first index information are 0, the head index value and the tail index value of the second index information are 0, the value of the first phase bit is 0, and the value of the second phase bit is 1. It may be illustrated that, in the index table 221 stored in the shared memory 220, data up to index #0 is stored and the entry data generated by the hardware group 210 is stored at index #1. The table 240 of FIG. 2 may show an embodiment in which the head index values, tail index values, and phase bits, stored in the first memory 233 and the second memory 211, are changed according to the transfer of the entry data. The table 240 shows only an embodiment of the change in index values, and the index values may be variously changed.

The hardware group 210 may increase the tail index value of the second index information to 1 in response to the generation of the entry data. Because the tail index value does not exceed the maximum value, the value of the second phase bit may be maintained. The hardware group 210 may calculate the second address based on the base address of the shared memory 220, the offset address of the first interface, the size of entry data, and the increased tail index value. In an embodiment of the present disclosure, the second address may be a value obtained by multiplying the size of the entry data by the tail index value and by adding the base address of the shared memory 220, and the offset address of the first interface to the multiplied value.

The hardware group 210 may store the entry data in the shared memory 220 based on the second address, and may transfer the interrupt signal to the processor group 230. The interface converter 231 may increase the head index value of the first index information by 1 in response to the reception of the interrupt signal. That is, in response to the storage of the entry data in the shared memory 220, each of the head index value of the first index information and the tail index value of the second index information may be increased by 1, and the remaining values may be maintained.

The interface converter 231 may generate the first address based on the increased head index value of the first index information. The data transmitter 232 may receive the entry data stored in the shared memory 220 based on the first address. The data transmitter 232 may store the received entry data in the buffer memory. The interface converter 231 may compare the second phase bit included in the entry data with the first phase bit, and the data transmitter 232 may transfer the entry data to the processor 234 through the second interface in response to the case where the values of the second phase bit and the first phase bit are different from each other.

The data transmitter 232 may check the available space of the second interface based on the size of the entry data stored in the buffer memory. The data transmitter 232 may store the entry data in the available space in response to the case where the size of the available space of the second interface is equal to or greater than the size of the entry data. The entry data stored in the available space may be transferred to the processor 234.

The processor 234 may be an operation unit which processes the entry data. The processor 234 may include an event table which stores the history of input/output data. The processor 234 may read the entry data received through the event table.

The data transmitter 232 may generate a result signal indicating the result of transferring the entry data, and may output the generated result signal to the interface converter 231. The interface converter 231 may increase each of the tail index value of the first index information and the head index value of the second index information by 1. When the entry data is generated and transferred to the processor 234, each of the head index value and the tail index value of the first index information may be increased by 1 and each of the head index value and the tail index value of the second index information may be increased by 1, compared to the values before the entry data is transferred. Because the increased index value does not exceed the maximum value, the phase bits may be maintained. The initial values of the first phase bit and the second phase bit may be set to different values.

In an embodiment of the present disclosure, the hardware group 210 may change the interrupt signal from low to high in response to the storage of the entry data in the shared memory 220, and may maintain the interrupt signal until the hardware group 210 enters an idle state. Because the hardware group 210 does not have a waiting time for the transfer of the interrupt signal, the time required by the hardware group 210 to store the entry data in the shared memory 220 may be shortened. The processor group 230 may periodically check whether the value of the phase bit included in the entry data is changed in response to the interrupt signal remaining high. The processor group 230 may receive the entry data from the shared memory 220 in response to the case where the head index value and the tail index value of the first index information are different from each other even when the interrupt signal is changed to low. Because the head index value of the first index information is changed in response to the transfer of the entry data to the processor, the head index value and the tail index value of the first index information may become equal to each other. The processor group 230 may check the completion of data transmission and terminate the operation in response to the case where the interrupt signal is changed to low and the head index value and the tail index value of the first index information are equal to each other.

Figure 3:
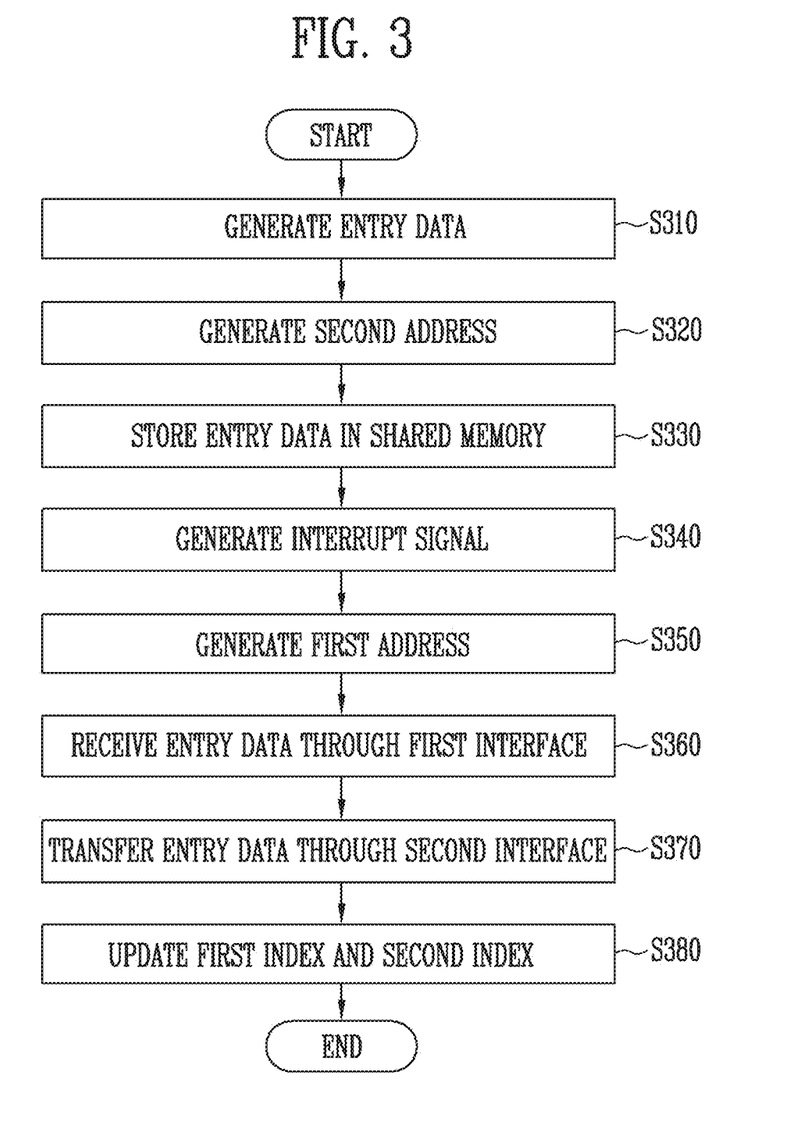
FIG. 3 is a flowchart for describing a method of transferring entry data to a processor according to an embodiment of the present disclosure.

FIG. 3 is a flowchart for describing a method of transferring entry data to a processor according to an embodiment of the present disclosure.

Referring to FIG. 3, the entry data may be temporarily stored in a shared memory, and may be transferred to the processor through a first interface and a second interface. The first interface is advantageous in that compatibility is high owing to the possibility to change a data input/output scheme, and the second interface is advantageous in that a data input/output speed is high. The present disclosure may improve a data transfer rate while maintaining compatibility in data transmission by transferring the entry data through the first interface and the second interface.

At operation S310, a hardware group may generate entry data including result data of an operation corresponding to a command. The entry data may refer to data transferred from the hardware group to the processor through the interface.

At operation S320, the hardware group may generate a second address indicating a location at which the entry data is to be stored in the shared memory based on second index information stored in a second memory. The hardware group may update the second index information in response to the generation of the entry data. The second address may be generated based on the tail index value of the updated second index information.

At operation S330, the hardware group may store the entry data in the shared memory based on the second address.

At operation S340, the hardware group may generate an interrupt signal indicating that the entry data has been stored in the shared memory. The hardware group may output the interrupt signal to a processor group in response to the storage of the entry data in the shared memory.

At operation S350, an interface converter may update first index information in response to the reception of the interrupt signal. The Interface converter may increase the tail index value of the first index information by 1, and may generate a first address indicating a location at which the entry data is stored in the shared memory based on a value increased from the head index value of the first index information by 1. The first address may match the second address to indicate the same location in the shared memory. The interface converter may output the first address to a data transmitter.

At operation S360, the data transmitter may receive the entry data from the shared memory through the first interface based on the first address. The first interface may be an interface, a data input/output scheme of which can be set by firmware during a boot operation. The data transmitter may verify the reliability of the received entry data by comparing a second phase bit included in the received entry data with a first phase bit stored in the processor group. The data transmitter may store the received entry data in the buffer memory.

In an embodiment of the present disclosure, because the initial values of the first phase bit and the second phase bit are set to different values, the case where the values of the first phase bit and the second phase bit are not maintained differently may indicate that a data transmission error has occurred. For example, when erroneous entry data is received or when index information and phase bits are falsely updated, the values of the first phase bit and the second phase bit may be equal to each other.

At operation S370, the data transmitter may transfer the entry data stored in the buffer memory to the processor through the second interface. The data transmitter may check an available space in the second interface before transmitting the entry data. The data transmitter may store the entry data in the available space of the second interface in response to the case where the size of the available space of the second interface is equal to or greater than the size of the entry data. The data transmitter may output a result signal indicating the result of transferring the entry data to the available space of the second interface to the interface converter.

At operation S380, the interface converter may additionally update the first index information and the second index information, based on the result signal. The interface converter may increase each of the tail index value of the first index information and the head index value of the second index information by 1 in response to the transfer of the entry data to the processor.

Figure 4:
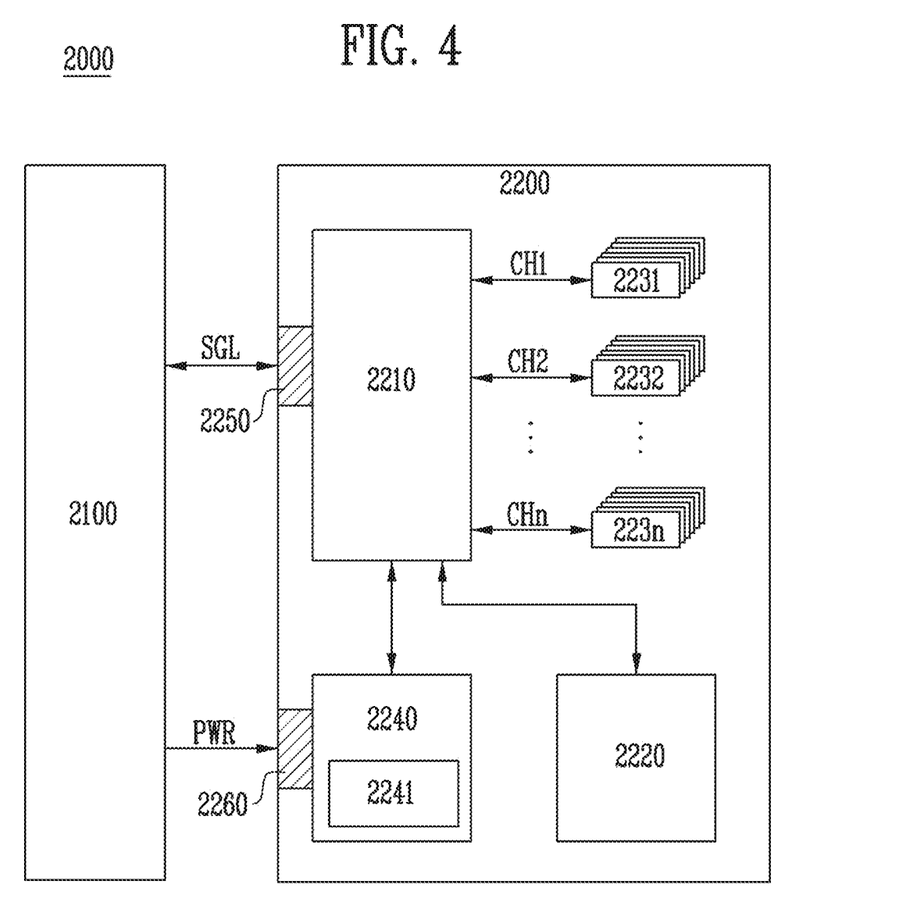
FIG. 4 is a diagram illustrating a data processing system according to an embodiment of the present disclosure.

FIG. 4 is a diagram illustrating a data processing system 2000 according to an embodiment of the present disclosure. Referring to FIG. 4, the data processing system 2000 may include a host device 2100 and a solid state drive (SSD) 2200.

The SSD 2200 may include a controller 2210, a buffer memory device 2220, nonvolatile memories 2231 to 223n, a power supply 2240, a signal connector 2250, and a power connector 2260.

The buffer memory device 2220 may temporarily store data to be stored in the nonvolatile memories 2231 to 223n. Also, the buffer memory device 2220 may temporarily store data read from the nonvolatile memories 2231 to 223n. The data temporarily stored in the buffer memory device 2220 may be transmitted to the host device 2100 or the nonvolatile memories 2231 to 223n under the control of the controller 2210.

The nonvolatile memories 2231 to 223n may be used as storage media of the SSD 2200. The nonvolatile memories 2231 to 223n may be coupled to the controller 2210 through a plurality of channels CH1 to CHn, respectively. One or more nonvolatile memories may be coupled to one channel. The nonvolatile memories coupled to one channel may be coupled to the same signal bus and the same data bus.

The controller 2210 may control operations of the SSD 2200. In an embodiment of the present disclosure, the controller 2210 may transfer entry data including the result of performing a command to a processor. The controller 2210 may generate a first address indicating a location at which the entry data is stored in the shared memory based on index information. The controller 2210 may receive the entry data through a first interface, a data input/output scheme of which can be set by firmware, based on the first address, and may store the received entry data in a buffer memory. The controller 2210 may transfer the entry data stored in the buffer memory to the processor through a second interface, a data input/output scheme of which is preset (i.e., fixed).

The power supply 2240 may provide power PWR received through the power connector 2260 into the SSD 2200. The power supply 2240 may include an auxiliary power supply 2241. When a sudden power-off occurs, the auxiliary power supply 2241 may supply power so that the SSD 2200 normally shuts off. The auxiliary power supply 2241 may include large-capacity capacitors capable of charging power PWR.

The controller 2210 may exchange a signal SGL with the host device 2100 through the signal connector 2250. Here, the signal SGL may include a command, an address, data, etc. The signal connector 2250 may be implemented as various types of connectors depending on the interface scheme of the host device 2100 and the SSD 2200.

According to embodiments of the present disclosure, there are provided a memory controller and a data transfer method, which are capable of improving data input/output performance by transferring data through interfaces supporting different input/output schemes.

The scope of the present disclosure is defined by the accompanying claims, rather than by the detailed description, and all modifications or changes derived from the meaning and scope of the claims and equivalents thereof should be construed as falling within the scope of the present disclosure. Furthermore, the embodiments may be combined to form additional embodiments.

What is claimed is:

1. A memory controller comprising:
a shared memory configured to temporarily store data;
a hardware group configured to generate entry data including result data of an operation corresponding to a received command, and output an interrupt signal generated in response to storage of the entry data in the shared memory; and
a processor group configured to receive the entry data from the shared memory,
wherein the processor group comprises:
an interface converter configured to manage first index information of the entry data stored in the shared memory in response to the interrupt signal, and generate a first address for the entry data based on the first index information; and
a data transmitter configured to receive, based on a first address, the entry data through a first interface using a data input/output scheme that is to be set by firmware, and transfer the received entry data to a processor through a second interface using a fixed data input/output scheme.

2. The memory controller according to claim 1, wherein the hardware group is configured to manage second index information of the entry data in response to generation of the entry data, and store the entry data in the shared memory according to a second address generated based on the second index information, and
wherein the first address and the second address matching each other are pieces of information indicating a location of the entry data stored in the shared memory.

3. The memory controller according to claim 2, wherein the interface converter is configured to update a head index value of the first index information and generate the first address based on the head index value.

4. The memory controller according to claim 3, wherein the interface converter is configured to update a first phase bit indicating a state of the first interface when the head index value exceeds a maximum value, and wherein the maximum value is determined according to a size of a queue set by the firmware.

5. The memory controller according to claim 4, wherein the data transmitter is configured to determine whether the entry data is received based on the first phase bit and a second phase bit included in the entry data, and wherein the second phase bit is set by the hardware group.

6. The memory controller according to claim 5, wherein the data transmitter is configured to store the entry data in a buffer memory when values of the first phase bit and the second phase bit are different from each other.

7. The memory controller according to claim 5, wherein the hardware group is configured to update a tail index value of the second index information, generate the second address based on the tail index value, and update the second phase bit when the tail index value reaches the maximum value.

8. The memory controller according to claim 2, wherein the data transmitter is configured to output, to the interface converter, a result signal indicating a result of transfer of the entry data through the second interface, and wherein the second interface is an interface configured to directly couple the processor to the data transmitter.

9. The memory controller according to claim 8, wherein the interface converter is configured to update a tail index value of the first index information and a head index value of the second index information based on the result signal.

10. A method of operating a memory controller, the method comprising:

storing, in a shared memory, entry data including result data of an operation corresponding to a command;

generating an interrupt signal in response to storage of the entry data;

generating a first address indicating a location at which the entry data is stored in the shared memory, based on first index information stored in a processor group in response to the interrupt signal;

receiving, based on the first address, the entry data through a first interface using a data input/output scheme that is to be set by firmware; and transferring the received entry data to a processor through a second interface using a fixed data input/output scheme.

11. The method according to claim 10, wherein storing the entry data comprises:

generating the entry data;

updating second index information included in a data generation group by which the entry data is generated in response to generation of the entry data; and generating a second address matching the first address based on the second index information.

12. The method according to claim 11, wherein generating the first address comprises:

updating the first index information; and updating a first phase bit indicating a state of the first interface based on the first index information.

13. The method according to claim 12, wherein receiving the entry data comprises:

comparing the first phase bit with a second phase bit included in the entry data; and storing the entry data in a buffer memory in response to a determination that the first phase bit is different from the second phase bit.

14. The method according to claim 13, wherein transferring the received entry data comprises:

checking an available space in the second interface based on a size of the entry data stored in the buffer memory;

is storing the entry data in the available space in response to a determination that a size of the available space is equal to or greater than a size of the entry data;

transferring the entry data stored in the available space to the processor;

generating a result signal indicating a result of transferring the entry data in the available space; and updating the first index information and the second index information based on the result signal.

15. A memory controller comprising:

a shared memory configured to temporarily store data;

a data generation group configured to generate entry data to be transferred to a processor, and store the entry data in the shared memory; and a data processing group configured to receive the entry data stored in the shared memory through a first interface using a data input/output scheme which is to be set by firmware, and transfer the entry data to the processor through a second interface using a fixed data input/output scheme.

16. The memory controller according to claim 15, wherein a size of queue in which the entry data is stored of the first interface is flexible, and is wherein the second interface is coupled to the processor in a first-in, first-out (FIFO) manner.

17. The memory controller according to claim 15, wherein the data processing group comprises a first memory configured to store first index information which is used to generate a first address indicating a location at which the entry data is stored in the shared memory and store a first phase bit which indicates a state of the entry data received through the first interface, and wherein the data generation group comprises a second memory configured to store second index information which is used to generate a second address indicating a location at which the entry data is stored in the shared memory and store a second phase bit which indicates a state of the entry data stored in the shared memory.

18. The memory controller according to claim 17, wherein the data generation group is configured to update the second index information in response to generation of the entry data, generate the second address based on the updated second index information, and output an interrupt signal generated in response to storage of the entry data at the second address to the data processing group, and wherein the data processing group is configured to update the first index information in response to reception of the interrupt signal, generate the first address based on the updated first index information, and receive the entry data from the shared memory based on the first address.

19. The memory controller according to claim 18, wherein the data processing group is configured to determine whether the entry data is received based on the first phase bit and the second phase bit.

20. The memory controller according to claim 18, wherein the data processing group is configured to additionally update the first index information and the second index information based on a result of transferring the entry data.

* * * * *